US007138989B2

(12) United States Patent
Mendelson et al.

(10) Patent No.: US 7,138,989 B2
(45) Date of Patent: Nov. 21, 2006

(54) DISPLAY CAPABLE OF DISPLAYING IMAGES IN RESPONSE TO SIGNALS OF A PLURALITY OF SIGNAL FORMATS

(75) Inventors: Jonathan D. Mendelson, Mountain View, CA (US); Oscar I. Medina, San Jose, CA (US); Susan R. Poniatowski, San Jose, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 277 days.

(21) Appl. No.: 10/626,576

(22) Filed: Jul. 25, 2003

(65) Prior Publication Data

US 2004/0150650 A1 Aug. 5, 2004

Related U.S. Application Data

(63) Continuation of application No. 09/662,837, filed on Sep. 15, 2000, now abandoned.

(51) Int. Cl.

| | |
|---|---|
| ***G09G 5/00*** | (2006.01) |
| ***G06F 13/14*** | (2006.01) |
| ***G05B 19/18*** | (2006.01) |
| *G06F 15/16* | (2006.01) |
| *G06F 3/00* | (2006.01) |

(52) U.S. Cl. ....................... 345/204; 345/3.1; 345/520; 700/6; 700/28; 709/217; 709/227; 710/7

(58) Field of Classification Search ................ 345/204, 345/699, 502, 520, 522, 556, 589, 594; 700/6, 700/28, 75, 76, 83; 709/217, 227, 230, 240, 709/250; 710/7, 129, 130, 301
See application file for complete search history.

(56) References Cited

U.S. PATENT DOCUMENTS

| | | | | |
|---|---|---|---|---|
| 4,268,906 | A * | 5/1981 | Bourke et al. | 710/49 |
| 4,760,387 | A | 7/1988 | Ishii et al. | |
| 5,465,105 | A | 11/1995 | Shatas et al. | |
| 5,606,348 | A * | 2/1997 | Chiu | 345/213 |
| 5,894,594 | A | 4/1999 | Kang | |
| 5,917,552 | A * | 6/1999 | Van Court | 348/558 |
| 6,028,646 | A * | 2/2000 | Jeong et al. | 348/645 |
| 6,061,633 | A | 5/2000 | Fukuhara et al. | |
| 6,169,539 | B1 * | 1/2001 | Lee et al. | 345/204 |
| 6,223,283 | B1 | 4/2001 | Chaiken et al. | |

(Continued)

OTHER PUBLICATIONS

Video Electronics Standards Association, Display Data Channel Standard (version 3.6p, Sep. 1997) (entire document).

(Continued)

*Primary Examiner*—Henry N. Tran
(74) *Attorney, Agent, or Firm*—Sterne, Kessler, Goldstein & Fox P.L.L.C.

(57) ABSTRACT

A display is capable of displaying images in response to signals of a plurality of signal formats. The display includes a controller that is coupled to a plurality of image data interfaces. When the plurality of image data interfaces are simultaneously operating, the controller selects one of the plurality of image data interfaces according to preference variables associated with each of the plurality of image data interfaces. Each of the preference variables may indicate a relative priority of an image data signal format associated with the corresponding image data interface. In addition, each of the preference variables may indicate one or more performance metrics associated with the quality of image data signals received from the corresponding image data interface.

22 Claims, 11 Drawing Sheets

U.S. PATENT DOCUMENTS

| | | | | |
|---|---|---|---|---|
| 6,263,440 | B1 | 7/2001 | Pruett et al. | |
| 6,314,479 | B1 | 11/2001 | Frederick et al. | |
| 6,323,828 | B1 | 11/2001 | Perez | |
| 6,326,935 | B1 * | 12/2001 | Boger | 345/3.2 |
| 6,329,981 | B1 * | 12/2001 | Lin et al. | 345/204 |
| 6,333,750 | B1 * | 12/2001 | Odryna et al. | 345/629 |
| 6,345,330 | B1 * | 2/2002 | Chu | 710/65 |
| 6,373,476 | B1 | 4/2002 | Dalgleish et al. | |
| 6,538,675 | B1 | 3/2003 | Aratani et al. | |
| 6,816,129 | B1 | 11/2004 | Zimmerman | 345/1.1 |
| 6,839,055 | B1 * | 1/2005 | Nguyen | 345/204 |
| 7,009,616 | B1 * | 3/2006 | Mendelson et al. | 345/519 |
| 2002/0097234 | A1 | 7/2002 | Sauber | |
| 2004/0027357 | A1 | 2/2004 | Mendelson et al. | |

OTHER PUBLICATIONS

Video Electronic Standards Association, Enhanced Display Data Channel Standard (version 1, Sep. 2, 1999) (entire document).
Digital Display Working Group, Digital Visual Interface DVI (revision 1.0, Apr. 2, 1999) (entire document).
Video Electronics Standards Association, VESA Enhanced Extended Display Identification Data Standard (Release A, Revision 1, Feb. 9, 2000) (entire document).
U.S. Appl. No. 09/575,457, filed May 22, 2000; Specification and Figures 1-8 from Multi-Mode Display, Mendelson, Johnson et al.
*Appendix A: Specifications and Statements of Compliance*, 1 page.
*Datasheet, Silicon Graphics® Multilink™ For Silicon Graphics® 1600SW Flat Panel Monitor*, 2 pages (Copyright 1999).
*EDID — Webopedia Definition and Links*, 2 pages, printed from http://webopedia.internet.com/TERM/E/EDID.html (printed Feb. 26, 2000).

* cited by examiner

106

DISPLAY CAPABLE OF DISPLAYING IMAGES IN RESPONSE TO SIGNALS OF A PLURALITY OF SIGNAL FORMATS

CROSS REFERENCES TO RELATED APPLICATIONS

The copending U.S. patent application entitled "Multi-Mode Display," U.S. application Ser. No. 09/575,457, filed on May 22, 2000, is related to the present application, and is herein incorporated by reference in its entirety.

BACKGROUND OF THE INVENTION

1. Field of the Invention

The present invention relates generally to the operation of graphical displays, and more particularly to the interface between a graphical display and a processor.

2. Related Art

Processing systems typically include a processor connected to a display through a display interface. Often, such processors contain graphics subsystems that directly handle the transfer of information, such as image data and control signals, between the processor and the connected display via the display interface. Multi-mode displays are capable of receiving image data signals in different formats, and displaying images in response to these differently-formatted signals. Image data signals are often categorized as being either digital or analog. There are many different industry standards that define various digital and analog image data signal formats.

Certain industry standards provide mechanisms that allow a display to transmit information across a display interface to an attached processor. This information indicates an image data signal format that the display supports. Once this information is received, the attached processor is able to determine the appropriate signal format in which to send image data to the connected display.

Unfortunately, these existing standards do not enable a multi-mode display to indicate its entire set of supported image data signal formats. That is, these standards only allow a multi-mode display to indicate to the processor one image data signal format at a given time.

Accordingly, a disadvantage of these existing standards involves situations where a particular processor supports some, but not all of the image data signal formats that a multi-mode display can support. For example, if a display indicates to a processor a signal format that the processor does not support, the processor will be unable to send image data signals to the display, even though the processor may support other signal formats that are within the attached display's capabilities.

Additionally, existing industry-endorsed standards do not address the situation where a display is simultaneously presented with image data signals from more than one interface. In this situation, the display must be able to determine which interface's image data signals to display.

It is generally recognized that displays must comply with industry-endorsed standards to achieve market acceptance. If a display does not comply with such standards, then it will not necessarily inter-operate with processors and graphics subsystems that are prevalent in the marketplace. In addition, displays must also be easy to use and perform without excessive user interaction. Moreover, as the number of interface types increase, displays need the capability to select among multiple interfaces operating concurrently.

SUMMARY OF THE INVENTION

The present invention provides a display capable of displaying images in response to signals of a plurality of signal formats. In an embodiment, the display includes a controller that is coupled to a plurality of image data interfaces. When the plurality of image data interfaces are operating simultaneously, the controller selects one of the plurality of image data interfaces according to preference variables associated with each of the plurality of image data interfaces.

According to embodiments of the present invention, a first of the plurality of image data interfaces may be an analog screen data channel and a second of the plurality of image data interfaces may be a digital screen data channel.

Also, according to embodiments of the present invention, a first and a second of the plurality of image data interfaces may be elements of a display interface. Moreover, this display interface may comply with the Digital Visual Interface (DVI) standard.

In embodiments of the present invention, each of the preference variables indicates a relative priority of an image data signal format associated with the corresponding image data interface.

In further embodiments of the present invention, each of the preference variables indicates one or more performance metrics associated with the quality of image data signals received from the corresponding image data interface.

The present invention also provides a display adapter capable of receiving signals of a plurality of signal formats and converting the signals for display on a coupled display device. Furthermore, the present invention also provides methods of operation.

An advantage of the present invention is that it performs interface selection without excessive user interaction.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention.

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

Processing System

Figure 1A:
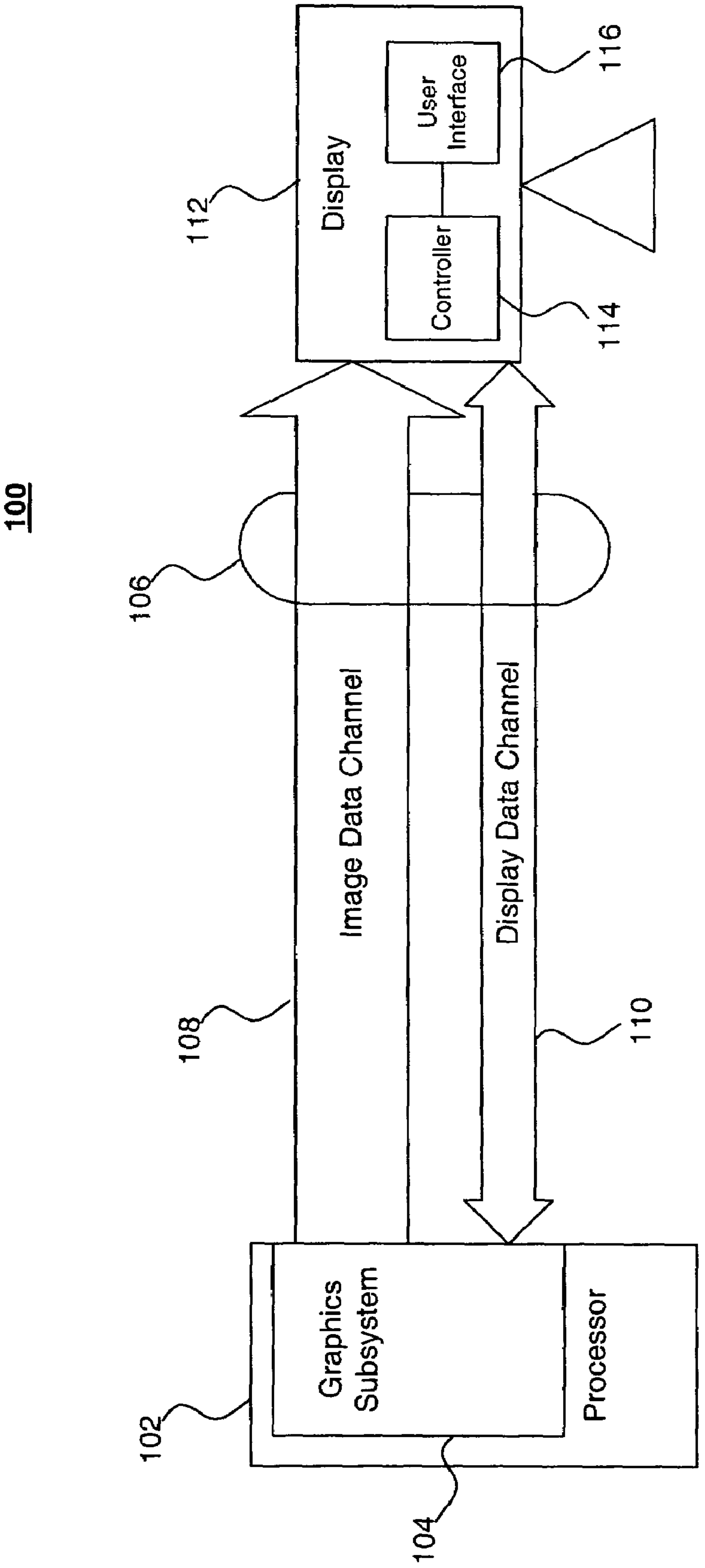
FIGS. 1A and 1B illustrate first and second computer systems according to the present invention.

FIG. 1A illustrates an exemplary processing system 100 according to an embodiment of the present invention. Processing system 100 comprises a processor 102, a display interface 106, and a display 112. Processor 102 and display 112 are connected by display interface 106. In an embodiment, display interface 106 includes an image data channel 108 and a display data channel 110.

In an embodiment, processor 102 is a computing platform, such as a personal computer or a workstation. However, processor 102 may also be hardware, firmware, or any processing system capable of interacting with a graphical display, as would be apparent to persons skilled in the relevant art(s). Processor 102 includes a graphics subsystem 104. Graphics subsystem 104 receives commands from processing units (not shown) within processor 102. Based on these commands, graphics subsystem 104 sends image data signals to display 112. Display 112 receives these image data signals and converts them into images that are displayed to a user. Graphics subsystem 104 also engages in bi-directional communication with display 112 across display interface 106.

Display 112 is a graphical display, such as a flat panel display or a cathode ray tube (CRT) display, that is capable of receiving image data signals. Once received, display 112 converts these signals into text and/or one or more graphical images that are displayed to a user. Display 112 is capable of receiving image data signals from display interface 106 in a plurality of different formats. Accordingly, display 112 is referred to herein as a multi-mode display. Multi-mode display 112 comprises a controller 114 and a user interface 116.

User interface 116 is coupled to controller 114. In an embodiment, user interface 116 enables a user to select a manual override mode of operation that interrupts operation of controller 114 according to an automatic mode. User interface 116 also enables a user to dictate the behavior of controller 114. In an embodiment, this includes a user selecting a particular image data signal format that is to be received and displayed by display 112.

User interface 116 may be any type of user interface that enables a user to select one of a plurality of image data signal formats. Examples of such user interfaces include mechanical switches, buttons, touch screens, graphical user interfaces (GUIs), and other user interfaces that would be apparent to persons skilled in the relevant art(s) from the teachings herein.

Controller 114 is coupled to user interface 116. Controller 114 receives signals from display data channel 110 and transmits signals across display data channel 110 to graphics subsystem 104. In particular, controller 114 transmits responses to requests that are originated by graphics subsystem 104. These responses are used by display 112 to indicate an image data signal format that is designated according to the automatic and/or manual override modes described herein.

As described herein, display interface 106 comprises an image data channel 108 and a display data channel 110. Image data channel 108 enables graphics subsystem 104 to send image data signals to display 112. These signals may conform to different analog and/or digital standards. An example of an analog display data standard is RGB component video (popularly referred to as "VGA graphics"). Examples of digital display data standards include DVI, DFP, P&D, Open LDI, as well as other well known digital display data formats and/or conventions apparent to persons skilled in the relevant art(s).

Display data channel 110 enables graphics subsystem 104 and controller 114 to engage in bi-directional data communications. In an embodiment, display data channel 110 enables graphics subsystem 104 and controller 114 to exchange information according to a request and response protocol. According to this protocol, graphics subsystem 104 sends requests for display data to display 112. In response to such requests, controller 114 replies with the requested display data. This display data indicates an image data signal format that is designated according to automatic and/or manual override modes, as described herein. For example, display data transmitted by display 112 can indicate whether display 112, according to either user or automatic selection, supports the reception of digital image data signals in a certain format, or analog image data signals in a certain format. In an embodiment, the display data transmitted by display 112 can indicate whether display 112, according to either user or automatic selection, supports the reception of digital signals in a first format, or digital signals in a second format. Moreover, the display data transmitted by display 112 can indicate whether display 112 supports reception of analog signals in a first format or analog signals in a second format.

In addition, display data transmitted by controller 114 can also indicate operational parameters of display 112, such as refresh rate and resolution. In one embodiment, the request and response protocol described above conforms to a standard known as Display Data Channel (DDC). This standard was developed by the Video Electronics Standards Association (VESA) of Milpitas, Calif., and is described in the VESA document *Display Data Channel Standard*, v3.6p, September 1997 (incorporated herein by reference in its entirety). In a further embodiment, this request and response protocol conforms to a standard developed by VESA known as Enhanced Display Data Channel (E-DDC). E-DDC is described in the VESA document *Enhanced Display Data Channel Standard*, Version 1, Sep. 2, 1999 (incorporated herein by reference in its entirety).

As described above, display interface 106 establishes a connection between processor 102 and display 112. In an embodiment of the present invention, display interface 106 comprises one or more cables that connect to processor 102 and display 112 via connectors. Examples of such connectors include DVI-D connectors, DVI-I connectors, DFP connectors, and VGA (HD15) connectors. These connectors are well known to persons skilled in the relevant art(s). Also, these connectors provide electrical interfaces for cables comprising multiple electrical conductors. In further embodiments, display interface 106 can be implemented with a data network. Examples of data networks include local area networks (LANs), such as high data rate Ethernets, wide area networks (WANs), wireless data networks, optical communications links, and other communications means, as would be apparent to persons skilled in the relevant art(s).

In an embodiment, display interface 106 complies with the Digital Visual Interface (DVI) standard. DVI is a standard developed by the Digital Display Working Group (DDWG), and is described in the document *Digital Visual Interface* (*DVI*), revision 1.0, Apr. 2, 1999 (incorporated herein by reference in its entirety). The DVI standard is implemented with a cable comprising multiple conductors. Each of these conductors is dedicated to a distinct electrical signal. These electrical signals, as specified by the DVI standard, include digital and analog image data signals, as well as digital and analog control signals.

DVI digital image data signals convey image data to displays, such as display 112, according to an electrical signaling format known as transition minimized differential signaling (TMDS). In contrast, DVI analog image data signals comply with a red, green, blue (RGB) transmission format, as would be apparent to persons skilled in the relevant art(s).

In an embodiment, image data channel 108 includes electrical conductors that transfer these image data signals from graphics subsystem 104 to display 112. Display data channel 110 includes electrical conductors that communicate data between graphics subsystem 104 and display 112 that indicates the capabilities of display 112.

In embodiments where display interface 106 complies with the DVI standard, display data channel 110 communications are conducted over a two-wire serial bus known as an Inter-Integrated Circuit ($I^2C$) interface, as developed by Philips Semiconductor. In further embodiments, a variety of other standard serial interfaces can carry display data channel 110 communications, as would be apparent to persons skilled in the relevant art(s). $I^2C$ interfaces enable two-way communication of baseband digital data between devices known as master devices and slave devices. $I^2C$ interfaces, as described above, comprise two conductors. These two conductors, or lines, are a serial data line (SDA) and a serial clock line (SCL). According to the present invention, processor 102 is an 12C master device, while controller 114 is an 12C slave device. According to the DVI standard, communications across the $I^2C$ display data channel 110 are conducted according to either the DDC or the E-DDC standards described above.

Figure 1B:
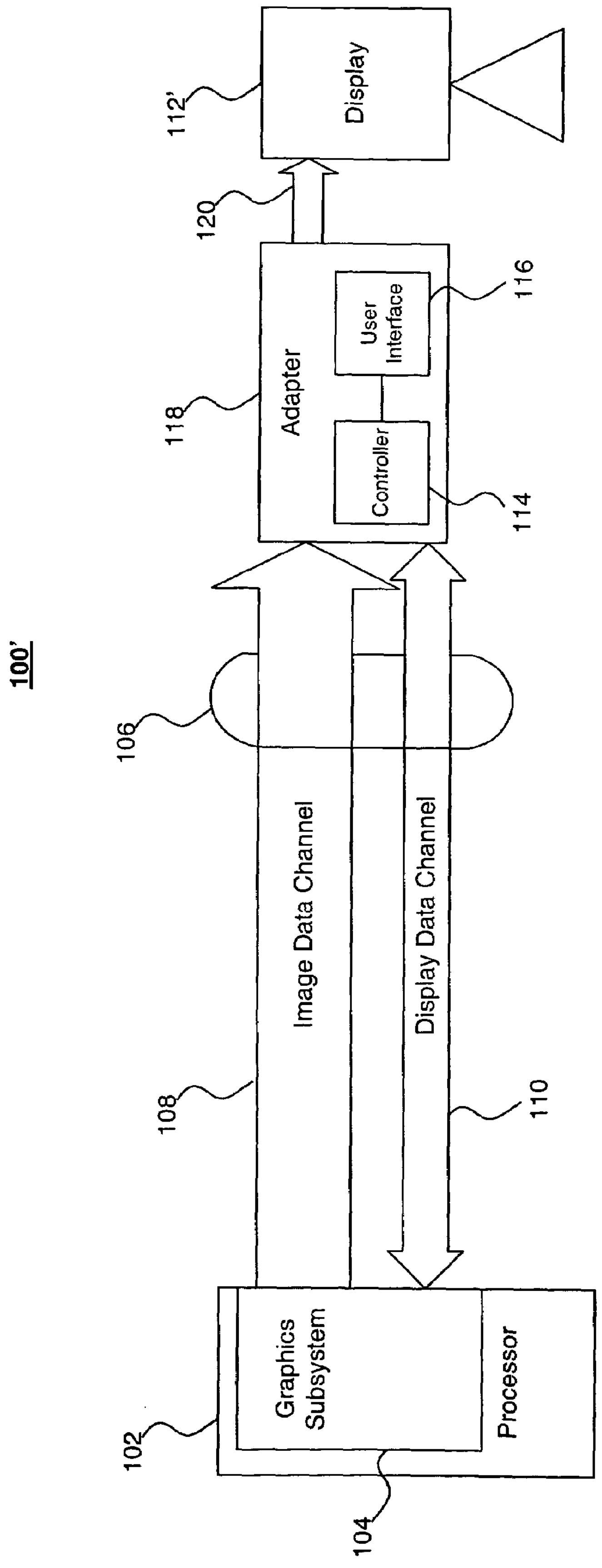

FIG. 1B illustrates a second processing system 100' according to the present invention. Like first processing system 100, second processing system 100' is capable of supporting multiple image data signal formats. However, instead of comprising a multi-mode display 112, second processing system 100' includes a single-mode display 112'. An adapter 118 provides an interface between display interface 106 and single-mode display 112'.

Like display 112, adapter 118 comprises controller 114 and user interface 116. Thus, in embodiments, adapter 118 is capable of receiving image data signals in multiple formats and engaging in bi-directional data communication with processor 102 over display data channel 110. When adapter 118 receives image data signals from graphics subsystem 104, it converts these signals, when necessary, into a format that is supported by display 112'. Adapter 118 then transfers the converted image data signals across an interface 120 to display 112'. Display 112' converts these signals into displayed text and/or images for a user.

Figure 2:
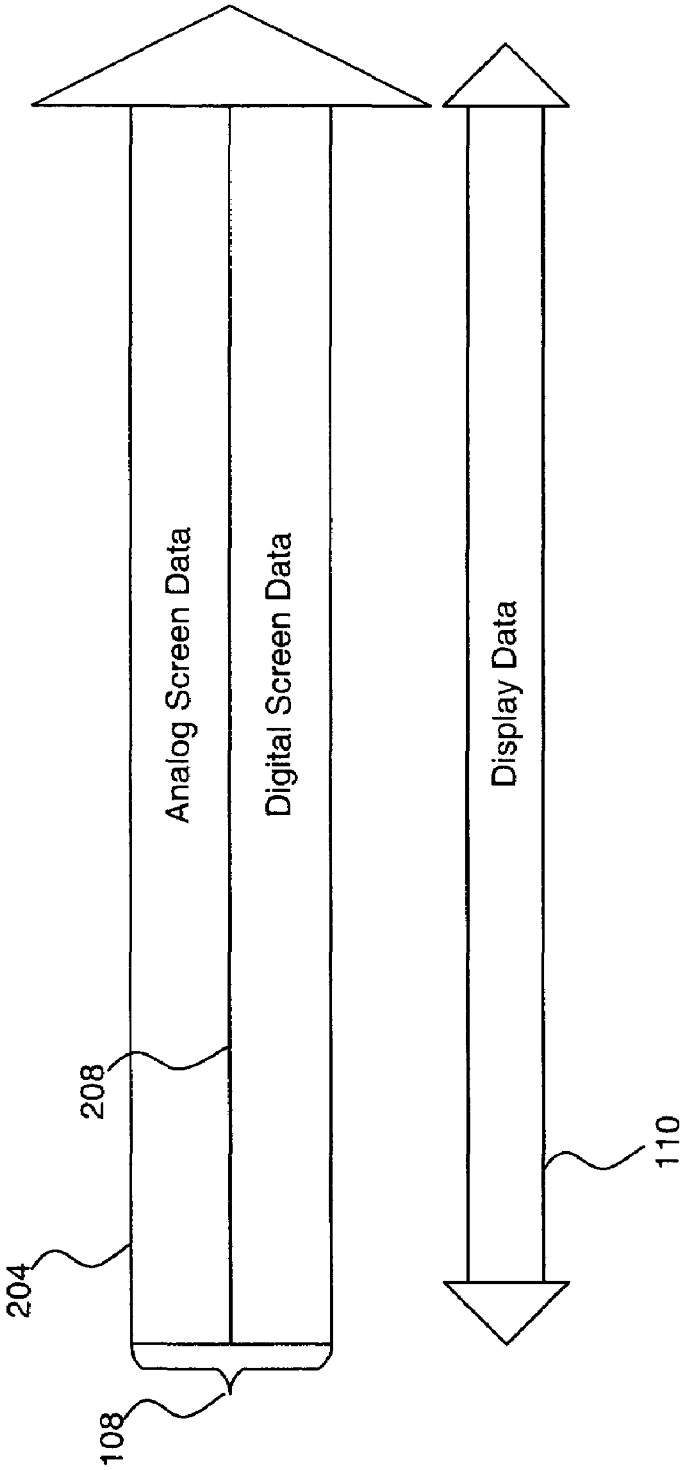
FIG. 2 illustrates a display interface according to the present invention.

FIG. 2 illustrates display interface 106 in greater detail. As described above, display interface 106 comprises a display data channel 110 and an image data channel 108. In an embodiment, image data channel 108 comprises an analog screen data channel 204 and a digital screen data channel 208. Analog screen data channel 204 conveys analog image signals and digital screen data channel 208 conveys digital image data signals. As described above, analog image data signals include RGB signals, as well as other analog signal formats that are apparent to persons skilled in the relevant art(s). Digital image data signals include signals in a variety of formats that are well known to persons skilled in the relevant art(s). In further embodiments, display interface 106 can include multiple analog and digital screen data channels 204 and 208, in any combination. Also, display interface 106 can include only an analog screen data channel 204 or only a digital screen data channel 208.

Request and Response Operation

Figure 3A:
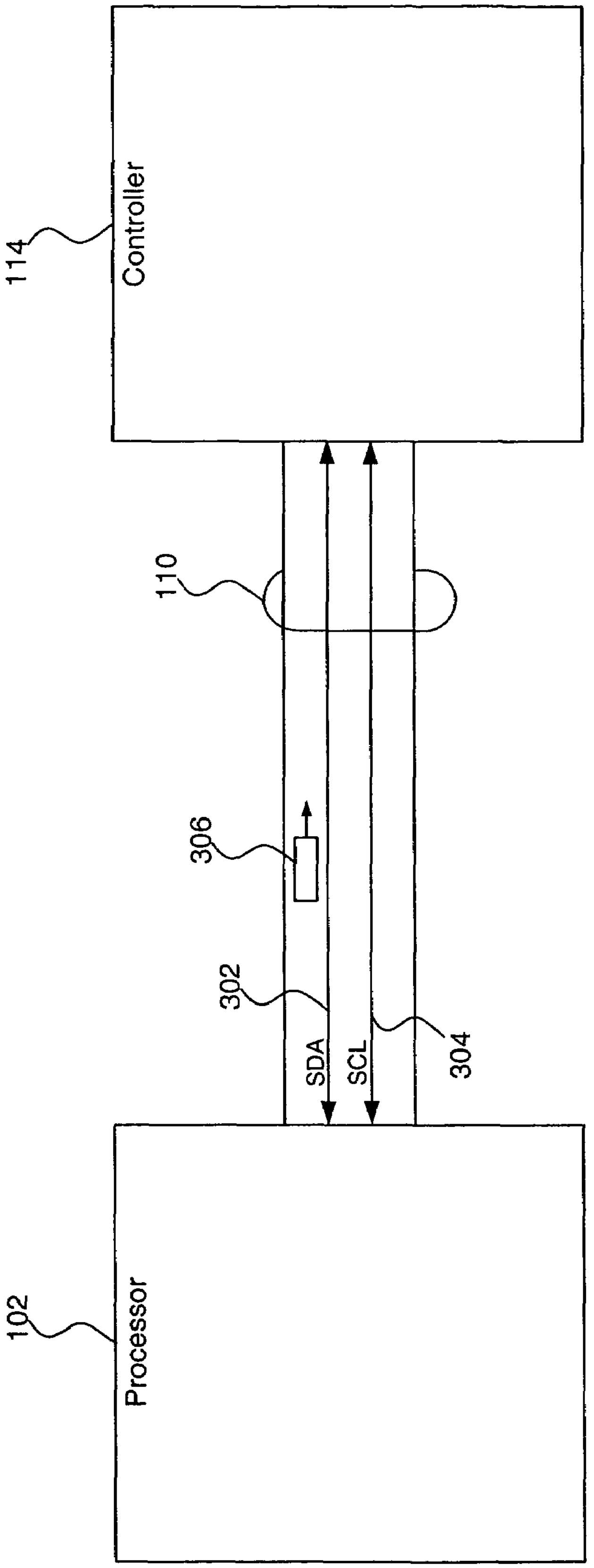
FIGS. 3A and 3B illustrate a display data channel according to the present invention.
Figure 3B:
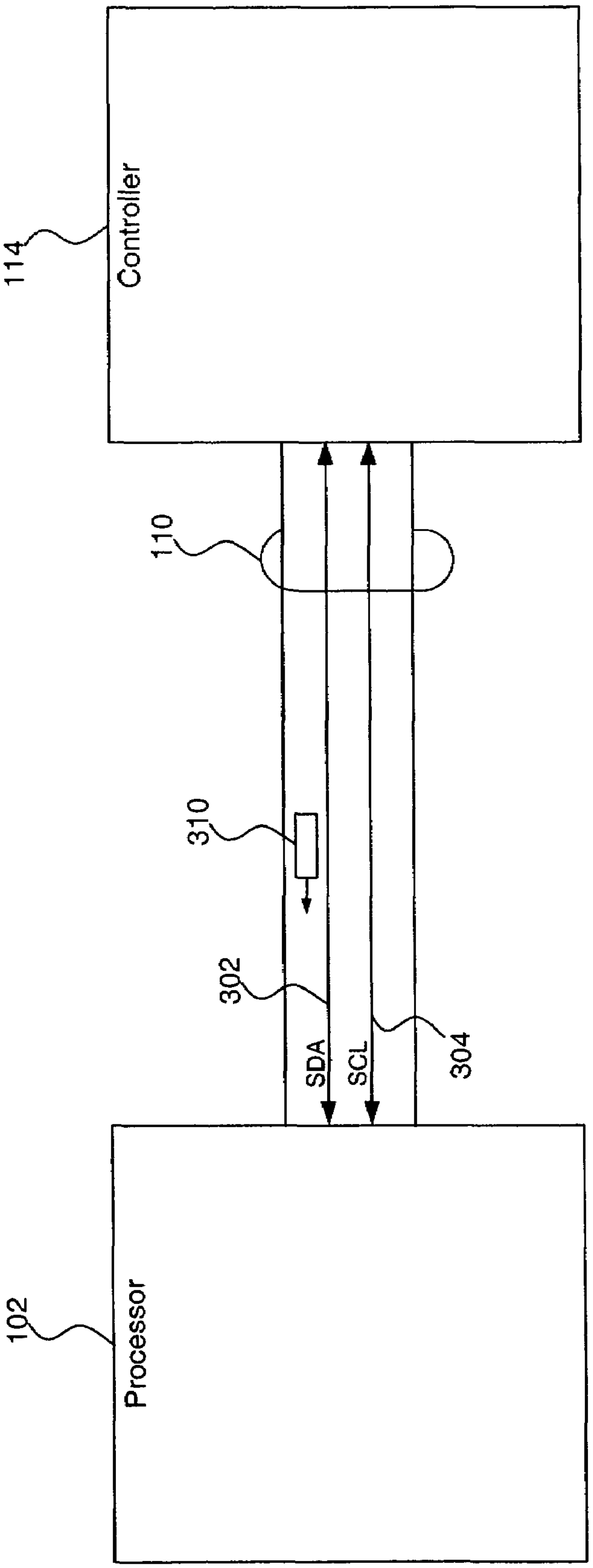

FIGS. 3A and 3B are block diagrams that illustrate an $I^2C$ display data channel 110. $I^2C$ display data channel 110 includes a serial data (SDA) line 302 and a serial clock (SCL) line 304. As illustrated in FIG. 3A, requests 306 that are transmitted by processor 102 across $I^2C$ display data channel 110 include an $I^2C$ slave address. According to the DVI standard, a designated FC slave address is used for all such requests. Controller 114 receives such requests.

As shown in FIG. 3B, controller 114 responds to requests 306 with a data structure 310. Data structure 310 describes an image data signal format. As described above, controller 114 transmits responses to requests received from processor 102 via display data channel 110. These responses comprise a data structure 310 that is associated with a display data signal format determined according to the automatic and/or manual override modes described herein.

According to the DVI standard, data structures 310 are Extended Display Identification Data (EDID) structures. However, data structures 310 can also be Enhanced Extended Display Identification Data (EEDID) structures. EDIDs and EEDIDs are industry standard data structures developed by VESA. These data structures allow a display to communicate its capabilities to processor 102, and are well known to persons skilled in the relevant art(s). Descriptions of these data structures are provided in *VESA Enhanced EDID Standard*, Release A, Rev. 1, Feb. 9, 2000 (incorporated herein by reference in its entirety). In further embodiments, data structures 310 can be formatted according to other industry standards, or can be in any format that is apparent to persons skilled in the relevant art(s) from the teachings herein.

As described herein, controller 114 is coupled to user interface 116. User interface 116 enables a user to activate a manual override mode of operation. This activation interrupts operation of controller 114 according to the automatic mode described herein. In addition, this activation may enable a user to dictate the behavior of controller 114. In an embodiment, this includes user selection of a particular image data signal format that is to be received and displayed by display 112 and/or 112'.

Figure 4:
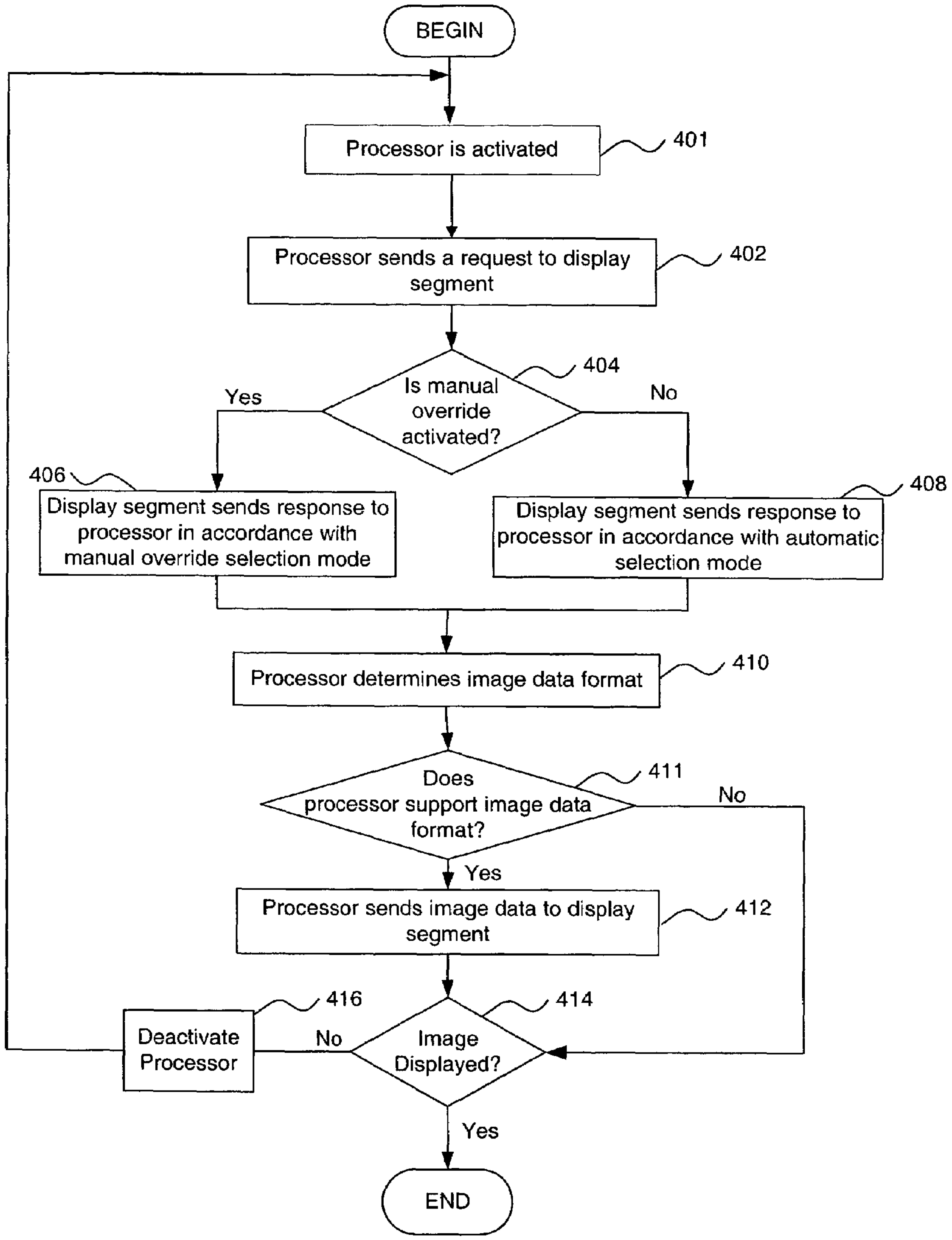
FIG. 4 is a flowchart illustrating an operation of the present invention.

FIG. 4 is a flowchart illustrating an operation of the present invention according to a request and response protocol. This operation begins with a step 401, where processor 102 is activated. In an embodiment, this step comprises powering on processor 102 and/or commanding graphics subsystem 104 to initialize communications with display 112 or adapter 118.

Next, in a step 402, processor 102 sends a request to display 112 or adapter 118. This request is transmitted across display data channel 110. In an embodiment, this request is a DDC request. However, in a further embodiment, this request is an E-DDC request.

A step 404 is performed next. In step 404, display 112 or adapter 118 determines whether a manual override mode has been selected by a user through user interface 116. In an embodiment, this step is performed by controller 114. If a manual override mode has been selected, performance of a step 406 follows. However, if a manual override mode has not been selected, performance of a step 408 follows.

In step 406, display 112 or adapter 118 sends a response to processor 102 in accordance with the user-selected manual override mode. In an embodiment, step 406 is performed by controller 114. This response is sent across display interface 106. In an embodiment, this response is sent across display data channel 110. This response is a data structure that indicates a particular image data signal format selected by a user through interaction with user interface 116. In an embodiment where the request sent in step 402 is a DDC request, this response is an EDID structure. However, in an embodiment where the request sent in step 402 is an E-DDC request, this response is an E-EDID structure.

In step 408, display 112 or adapter 118 sends a response to processor 102 in accordance with an automatic mode. In an embodiment, step 408 is performed by controller 114. This response is sent across display interface 106. In an embodiment, this response is sent across display data channel 110. This response is a data structure that indicates the image data signal format designated by controller 114 according to automatic mode designation criteria, such as a signal format priority scheme. An exemplary designation criteria involves associating priority designators with image data signal formats supported by display 112 or adapter 118, as described herein with reference to FIG. 5.

In an embodiment, where the request sent in step 402 is a DDC request, the response sent in step 408 is an EDID structure. However, in an embodiment where the request sent in step 402 is an E-DDC request, this response is an E-EDID structure.

In a step 410, processor 102 receives the response sent in step 406 or step 408. Processor 102 then determines the image data signal format described in the response. In an embodiment, this step is performed by graphics subsystem 104. After completion of step 410, a step 411 is performed. In this step, processor 102 determines whether it supports the image data signal format determined in step 410. In an embodiment, this step is performed by graphics subsystem 104.

If processor 102 determines in step 411 that it supports the image data signal format determined in step 410, then a step 412 is performed next. Otherwise, a step 414 is performed next. In step 412, processor 102 sends image data to display 112 or adapter 118 via image data channel 108 for display to a user. In one embodiment, this step is performed by graphics subsystem 104.

In step 414, the present invention determines whether an image is displayed on display 112. If an image is displayed, then the operation is complete. However, if an image is not displayed, then a step 416 is performed. In step 416, processor 102 is deactivated. This deactivation can comprise the steps of powering down processor 102, and/or commanding graphics subsystem 104 to reinitialize communications with display 112 or adapter 118. After performance of step 416, steps 302 through 414 are repeated, as described above.

Steps 401 through 414 are repeated until processor 102 sends image data across image data channel 108 that is supported by display 112 or adapter 118. Thus, the operation described above with reference to steps 401 through 414 may be performed multiple times. According to an automatic mode, controller 114 may designate various image data signal formats according a priority scheme. In an embodiment, such priority schemes may be based on the quality of images generated from signal formats supported by display 112 or adapter 118. For example, digital signal formats may produce better quality images than analog signal formats, and thus may be given a higher priority.

For example, upon a first performance of step 408, controller 114 sends a response to processor 102 that includes a data structure indicating a first priority image data signal format. If this response does not result in the display of an image on display 112 or 112', then, according to an embodiment, steps 401 through 414 are repeated. Upon this repeated performance of step 408, controller 114 sends a response to processor 102 that includes a data structure indicating a second priority image data signal format. In an embodiment, the repetition of steps 401 through 414 described above may occur any number of times, where each successive performance of step 408 results in controller 114 sending a response indicating a successively lower priority image data signal format.

Figure 5:
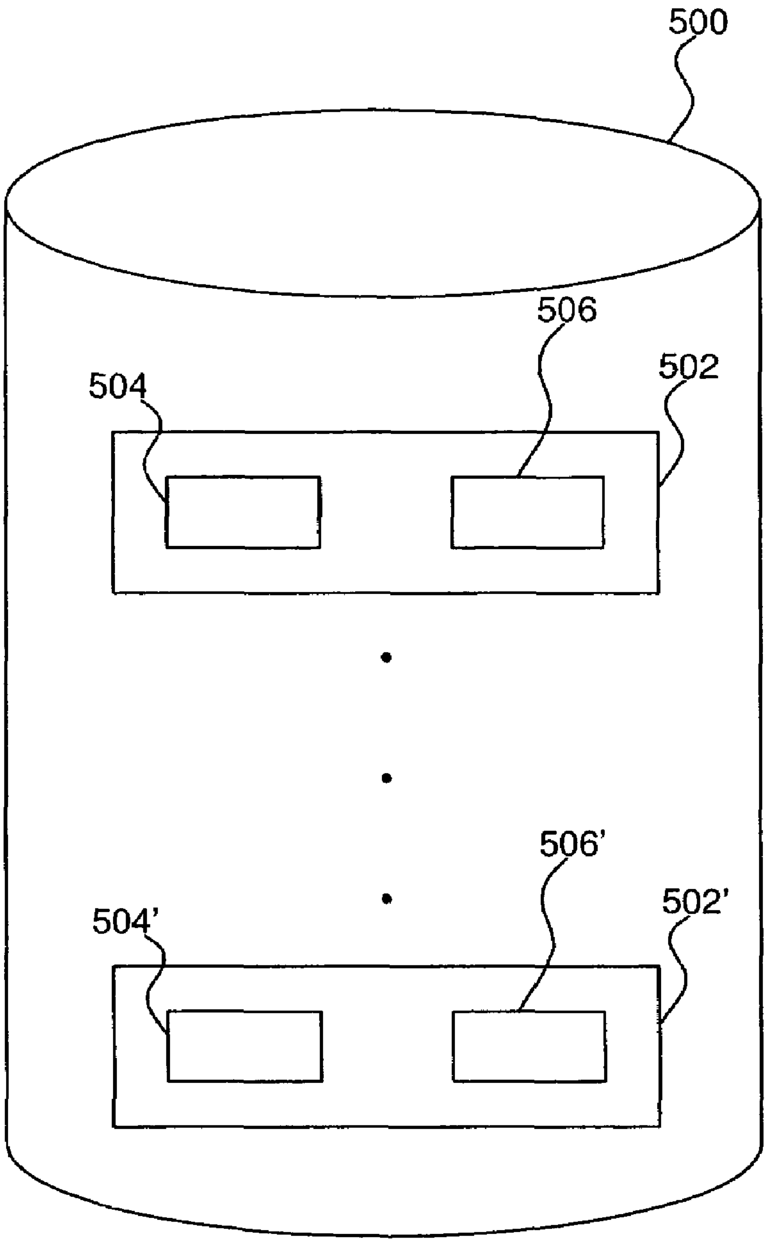
FIG. 5 is a diagram of an exemplary image data signal format database, according to the present invention.

In an embodiment, controller 114 includes an image data signal format database. FIG. 5 is a diagram of an exemplary image data signal format database 500. In this exemplary embodiment, image data signal format database 500 includes a plurality of records 502. Each of these records 502 corresponds to an image data signal format. Each record 502 includes a format descriptor 506 and a priority designator 504. Each format descriptor 506 identifies the corresponding image data signal format and/or interface format. Each priority designator 504 indicates the priority of the corresponding image data signal format. In an embodiment, format descriptors 506 include a data structure 310.

Controller 114 accesses data structures 310 from image data signal format database 500 and sends them to processor 102 in accordance with either an automatic mode, as described above with reference to step 308 or a manual override mode, as described above with reference to step 306.

In an embodiment, a user may configure exemplary image data signal format database 500. This configuration includes a user interacting with user interface 116 by populating image data signal format database 500 with records 502, and/or altering the priority designators 504 of one or more records 502.

Simultaneously Operating Image Data Interfaces

Controller 114 may detect a plurality of concurrently operating image data interfaces through image data channel 108. In an embodiment, these operating interfaces are of different formats. Also, these interfaces may convey data related to the same text and/or graphical image(s). However, in further embodiments, these interfaces may convey data related to different text and/or graphical image(s).

Figure 6A:
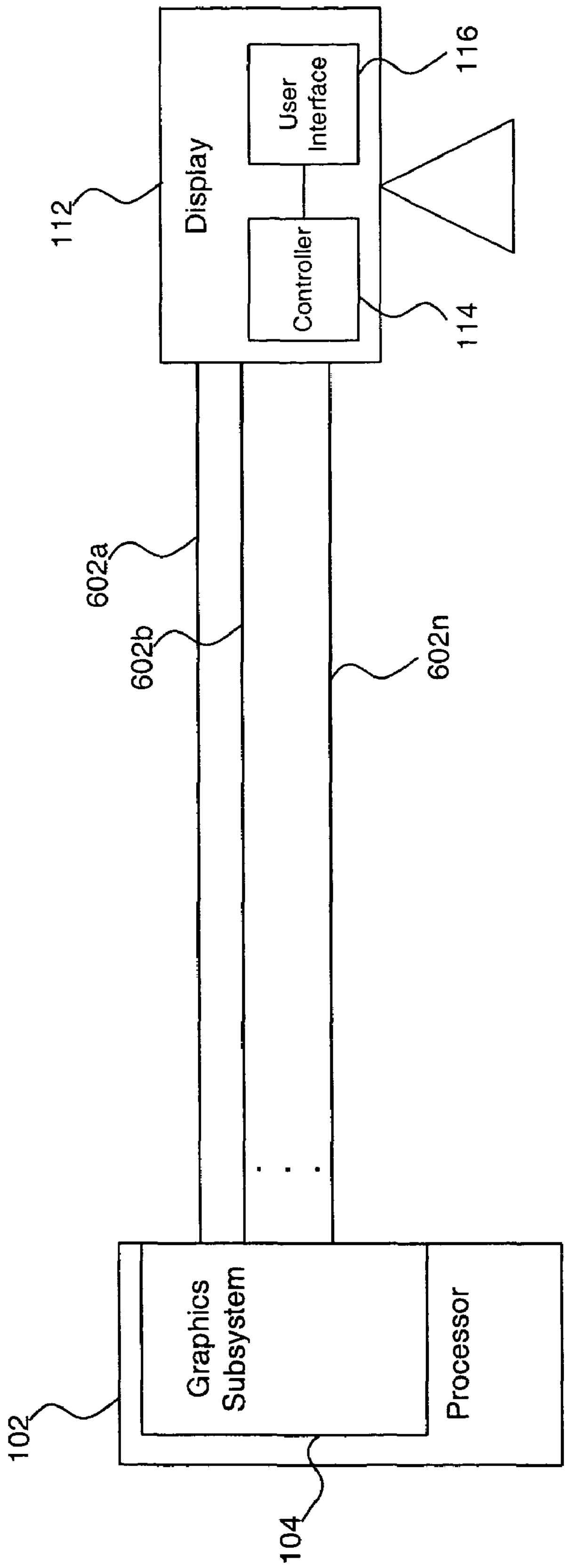
FIGS. 6A and 6B are block diagrams illustrating a plurality of concurrently operating image data interfaces.
Figure 6B:
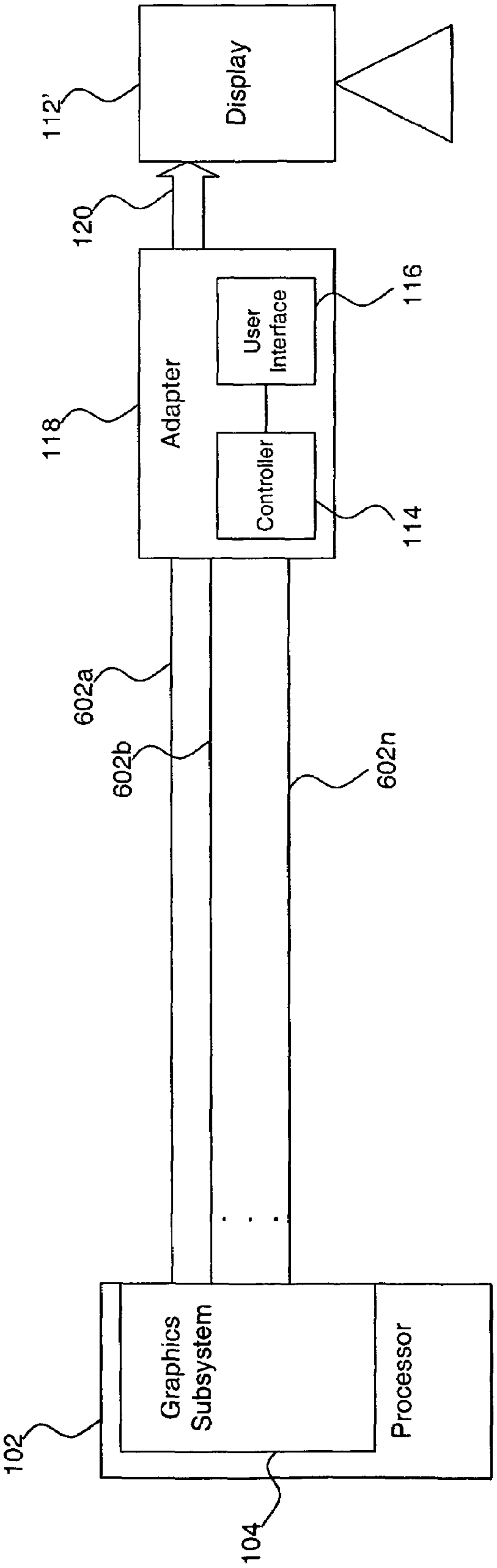

FIG. 6A is a block diagram illustrating a plurality of concurrently operating image data interfaces 602*a*–602*n* connecting processor 102 and display 112. Similarly, FIG. 6B is a block diagram illustrating a plurality of concurrently operating image data interfaces 602*a*–602*n* connecting processor 102 and adapter 118.

Each image data interface 602 can carry image data signals. Thus, each image data interface 602 may be any display interface known to persons skilled in the relevant art(s). Furthermore, image data interfaces 602 can be implemented with one or more data networks. Examples of data networks include local area networks (LANs), such as high data rate Ethernets, wide area networks (WANs), wireless data networks, optical communications links, and other communications means, as would be apparent to persons skilled in the relevant art(s).

In embodiments, one or more of the plurality of image data interfaces 602 may be a display interface 106, as described herein. Thus, an image data interface 602 may include an image data channel 108 and a display data channel 110.

In further embodiments, one or more of the plurality of image data interfaces 602 may be an analog screen data channel 204, a digital screen data channel 208, and/or any other channel of a display interface 106. Thus, some of the plurality of image data interfaces 602 may be elements of the same display interface 106. For example, one of the plurality of image data interfaces 602 may be an analog screen data channel 204 of a given display interface 106, while another of the plurality of image data interfaces 602 may be a digital screen data channel 208 of the same display interface 106.

Figure 7:
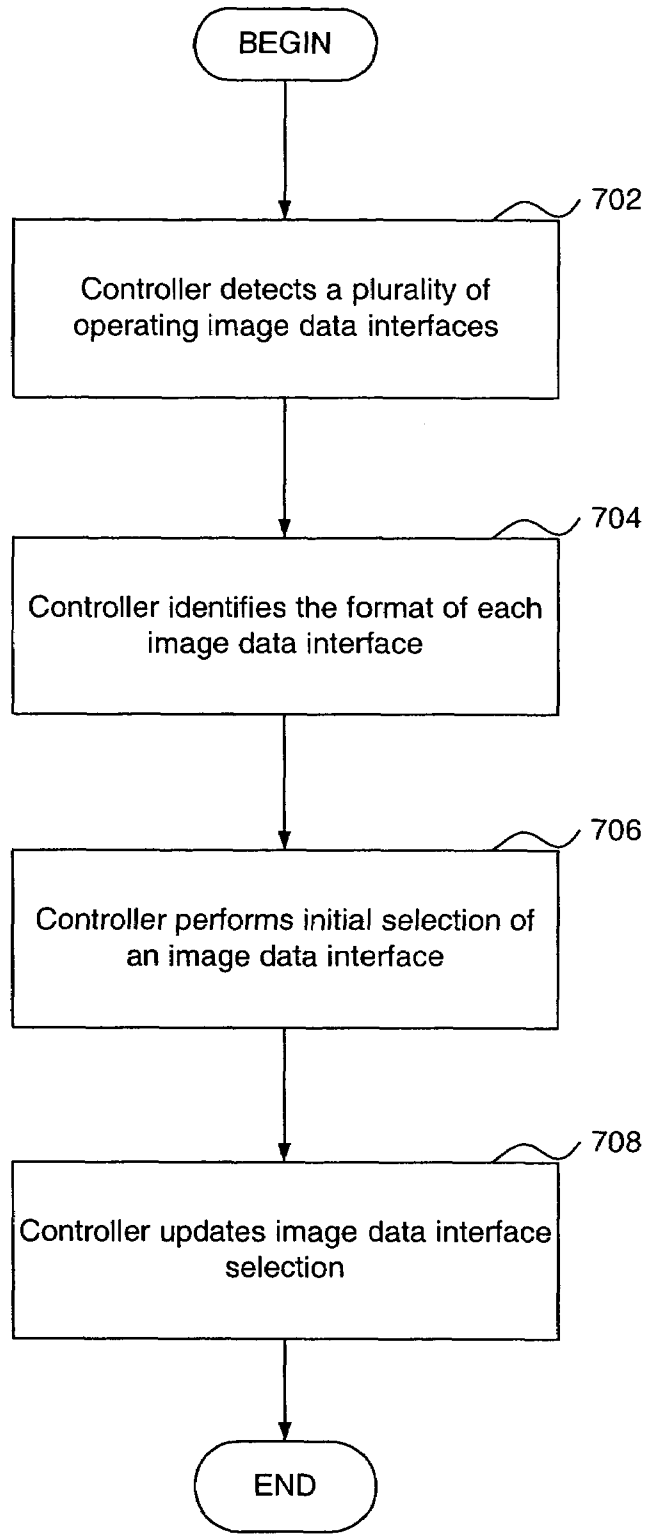
FIG. 7 is a flowchart illustrating an operation of the present invention.

FIG. 7 is a flowchart illustrating an operation of simultaneous detection and selection according to an embodiment of the present invention. This operation results in controller 114 selecting one of the plurality of image data interfaces 602 to receive image data signals for output on display 112 or 112'.

This process begins with a step 702, where controller 114 detects a plurality of operating image data interfaces 602 from image data channel 108. Step 702 comprises controller 114 detecting each of these image data interfaces 602 transmitting image data signals and/or control signals, thereby indicating that these interfaces are operational. In an embodiment, these operational interfaces originate from processor 102. However, in further embodiments, one or more of these interfaces may originate from other processing entities (such as other computers and/or workstations).

Next, in a step 704, controller 114 identifies the format of each image data interface 602. This identification comprises determining the format associated with transmissions received by controller 114 from each of the plurality of interfaces. In an embodiment, performance of this step involves the utilization of signal processing capabilities within controller 114, as would be apparent to persons skilled in the relevant art(s).

A step 706 follows the performance of step 704. In step 706, controller 114 performs an initial selection of one of the plurality of image data interfaces 602. In an embodiment, this selection step comprises the step of automatically choosing one of the image data interfaces according to preference variables associated with each of the image data interfaces 602. Each preference variable includes a value indicating a relative merit of a corresponding image data interface 602. In this step, controller 114 selects the image data interface 602 that has a preference variable value that indicates the greatest merit.

In an embodiment, each preference variable value is a priority designator 504 that indicates a relative priority of the image data signal format associated with the corresponding image data interface 602. Thus, step 706 may comprise the steps of determining the image data signal formats associated with each of the plurality of image data interfaces 602, accessing from image data signal format database 500 the priority designators 504 associated with each of these signal formats, and selecting the image data interface 602 corresponding to the highest priority designator 504.

As described herein, a user may interact with user interface 116 to set the priority designators 504 of one or more records 502 according to individual preference. Moreover, the priority designators 504 of one or more records 502 may be set automatically by controller 114. This automatic setting may be based on factors such as image quality produced by the corresponding image data signal formats. For example, a certain digital image data signal format may yield better quality images than a certain analog image data signal format. Thus, the priority designator 504 corresponding to the digital format would indicate a higher priority than the priority designator 504 corresponding to the analog format.

A step 708 follows the performance of step 706. In step 708, controller 114 updates the selection of an image data interface 602. In an embodiment, this step comprises the steps of accessing current preference variable values for each of the plurality of operating image data interfaces 602, and selecting the image data interface 602 that has a preference variable value indicating the greatest merit. Thus, step 708 may include the step of controller 114 changing the interface for reception of image data signals for output on display 112 or 112' from a first of the plurality of operating image data interfaces 602 to a second of the plurality of operating image data interfaces 602. However, step 708 may also include the step of controller 114 renewing the interface for reception of image data signals for output on display 112 or 112' as a first of the plurality of operating image data interfaces 602.

Step 708 may be performed when preference variables change over time. For example, each time varying preference variable may indicate one or more performance metrics associated with the quality of image data signals received from the corresponding image data interfaces 602. Examples of performance metrics corresponding to an operating image data interface 602 and/or its associated image data signals include, but are not limited to, resolution limits, color quality, bit error rate, signal to noise ratios, image saturation, resultant image quality and/or other information as would be apparent to persons skilled in the relevant art(s).

In an embodiment, upon detection of a plurality of simultaneously operating image data interfaces 602, automatic selection, as described herein with reference to steps 706 and 708 may be preempted by a manual "override" selection entered by a user through user interface 116. Moreover, when a manual "override" selection has been made, automatic selection, as described herein with reference to steps 706 and 708 may be reinstated by a user through interaction with user interface 116.

Computer System

Figure 8:
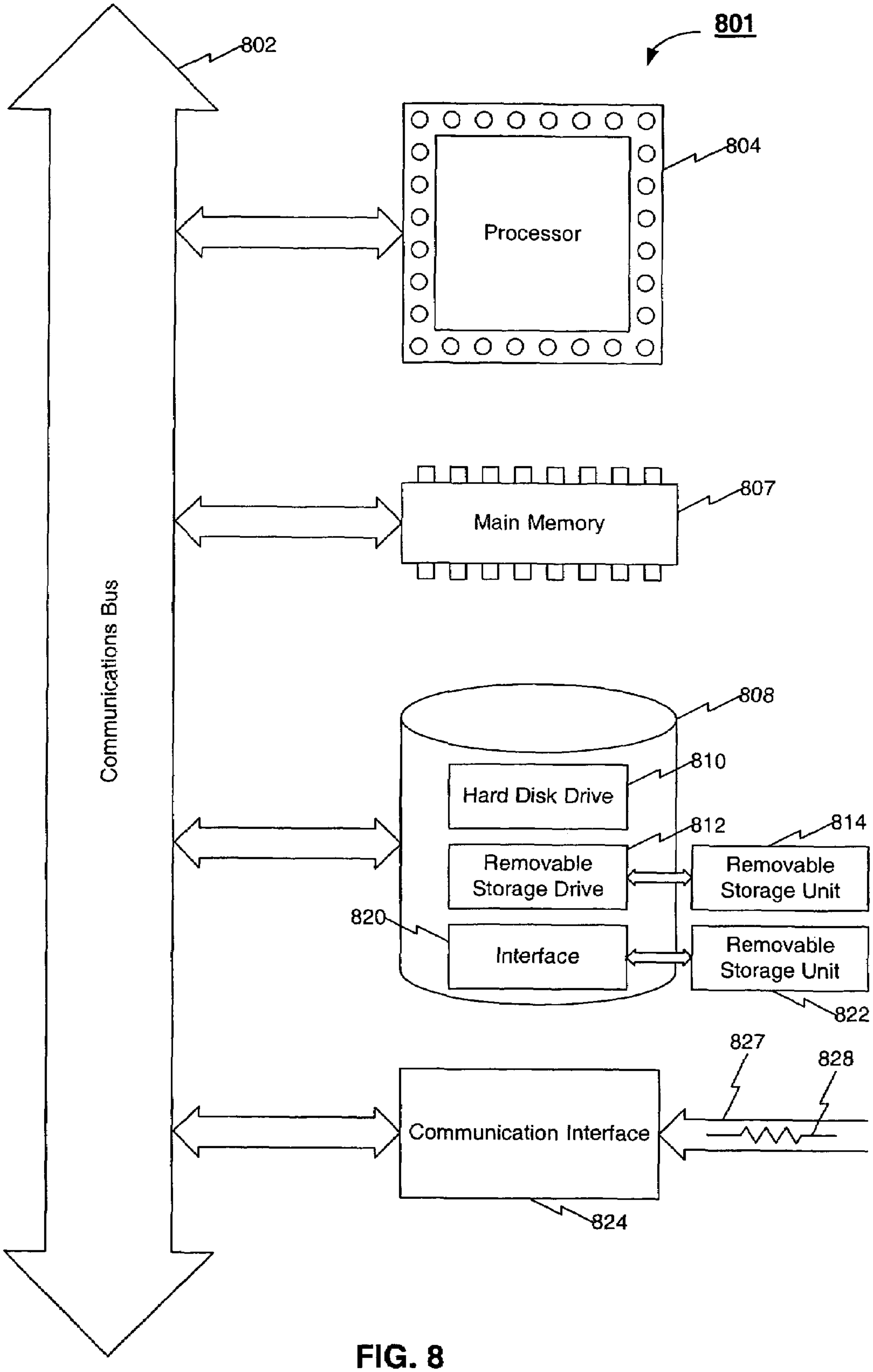
FIG. 8 is an illustration of an exemplary computer system.

Controller 114 of the present invention may be implemented using hardware, software or a combination thereof and may be implemented in a computer system or other processing system. In fact, in one embodiment, the invention is directed toward a computer system capable of carrying out the functionality described herein. An exemplary computer system 801 is shown in FIG. 8. Computer system 801 includes one or more processors, such as a processor 804. The processor 804 is connected to a communication bus 802. Various software embodiments are described in terms of this example computer system. After reading this description, it will become apparent to persons skilled in the relevant art how to implement the invention using other computer systems and/or computer architectures.

Computer system 802 also includes a main memory 806, preferably random access memory (RAM), and can also include a secondary memory 808. The secondary memory 808 can include, for example, a hard disk drive 810 and/or a removable storage drive 812, representing a floppy disk drive, a magnetic tape drive, an optical disk drive, etc. The removable storage drive 812 reads from and/or writes to a removable storage unit 814 in a well known manner. Removable storage unit 814, represents a floppy disk, magnetic tape, optical disk, etc. which is read by and written to by removable storage drive 812. As will be appreciated, the removable storage unit 814 includes a computer usable storage medium having stored therein computer software and/or data.

In alternative embodiments, secondary memory 808 may include other similar means for allowing computer programs or other instructions to be loaded into computer system 801. Such means can include, for example, a removable storage unit 822 and an interface 820. Examples of such can include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 801.

Computer system 801 can also include a communications interface 824. Communications interface 824 allows software and data to be transferred between computer system 801 and external devices. Examples of communications interface 824 can include a modem, a network interface (such as an Ethernet card), a communications port, a PCMCIA slot and card, etc. Software and data transferred via communications interface 824 are in the form of signals which can be electronic, electromagnetic, optical or other signals capable of being received by communications interface 824. These signals 826 are provided to communications interface via a channel 828. This channel 828 carries signals 826 and can be implemented using wire or cable, fiber optics, a phone line, a cellular phone link, an RF link and other communications channels.

In this document, the terms "computer program medium" and "computer usable medium" are used to generally refer to media such as removable storage device 812, a hard disk installed in hard disk drive 810, and signals 826. These computer program products are means for providing software to computer system 801.

Computer programs (also called computer control logic) are stored in main memory and/or secondary memory 808. Computer programs can also be received via communications interface 824. Such computer programs, when executed, enable the computer system 801 to perform the features of the present invention as discussed herein. In particular, the computer programs, when executed, enable the processor 804 to perform the features of the present invention. Accordingly, such computer programs represent controllers of the computer system 801.

In an embodiment where the invention is implemented using software, the software may be stored in a computer program product and loaded into computer system 801 using removable storage drive 812, hard drive 810 or communications interface 824. The control logic (software), when executed by the processor 804, causes the processor 804 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software. Examples of such combinations include, but are not limited to, microcontrollers.

CONCLUSION

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A display capable of displaying images in response to signals of a plurality of signal formats, comprising:

a controller that is coupled to a plurality of image data interfaces;

wherein said controller identifies the image data signal format associated with each of the plurality of image data interfaces and selects one of the plurality of image data interfaces according to preference variables associated with each of the plurality of image data interfaces when the plurality of image data interfaces are operating simultaneously.

2. The display of claim 1, wherein a first of the plurality of image data interfaces is an analog screen data channel and a second of the plurality of image data interfaces is a digital screen data channel.

3. The display of claim 1, wherein a first and a second of the plurality of image data interfaces are elements of a display interface.

4. The display of claim 3, wherein the display interface complies with at least one of a Digital Visual Interface (DVI) standard, an Open LVDS Display Interface (OpenLDI) standard, an RGB component video standard, a Digital Flat Panel (DFP) standard, and a Plug and Display (P&D) standard.

5. The display of claim 1, wherein each of the preference variables indicates a relative priority of an image data signal format associated with the corresponding image data interface.

6. The display of claim 1, wherein each of the preference variables indicates one or more performance metrics associated with the quality of image data signals received from the corresponding image data interface.

7. The display of claim 6, wherein the one or more performance metrics includes color quality.

8. The display of claim 6, wherein the one or more performance metrics includes image saturation.

9. A method of establishing operation between a processor and a display, the display capable of displaying images in response to signals of a plurality of signal formats generated by the processor, the method comprising the steps of:

detecting a plurality of image data interfaces operating simultaneously;

identifying the image data signal format of each of the plurality of image data interfaces; and selecting one of the plurality of image data interfaces.

10. The method of claim 9, further comprising the step of: updating the image data interface selection.

11. The method of claim 9, wherein said selecting step comprises the step of automatically choosing one of the plurality of image data interfaces according to preference variables associated with each of the plurality of image data interfaces.

12. A display adapter capable of receiving signals of a plurality of signal formats and converting the signals for display on a coupled display device, comprising:

a controller that is coupled to a plurality of image data interfaces;

wherein said controller identifies the image data signal format associated with each of the plurality of image data interfaces and selects one of the plurality of image data interfaces according to preference variables associated with each of the plurality of image data interfaces when the plurality of image data interfaces are operating simultaneously.

13. The display adapter of claim 12, wherein a first of the plurality of image data interfaces is an analog screen data channel and a second of the plurality of image data interfaces is a digital screen data channel.

14. The display adapter of claim 12, wherein a first and a second of the plurality of image data interfaces are elements of a display interface.

15. The display adapter of claim 14, wherein the display interface complies with at least one of a Digital Visual Interface (DVI) standard, an Open LVDS Display Interface (OpenLDI) standard, an RGB component video standard, a Digital Flat Panel (DFP) standard, and a Plug and Display (P&D) standard.

16. The display adapter of claim 12, wherein each of the preference variables indicates a relative priority of an image data signal format associated with the corresponding image data interface.

17. The display adapter of claim 12, wherein each of the preference variables indicates one or more performance metrics associated with the quality of image data signals received from the corresponding image data interface.

18. The display adapter of claim 17, wherein the one or more performance metrics includes color quality.

19. The display adapter of claim 17, wherein the one or more performance metrics includes image saturation.

20. A method of establishing operation between a processor and a display adapter, the display adapter capable of receiving signals of a plurality of signal formats and converting the signals for display on a coupled display device, the method comprising the steps of:

detecting a plurality of image data interfaces operating simultaneously;

identifying the image data signal format of each of the plurality of image data interfaces; and selecting one of the plurality of image data interfaces.

21. The method of claim 20, further comprising the step of:

updating the image data interface selection.

22. The method of claim 20, wherein said selecting step comprises the step of automatically choosing one of the plurality of image data interfaces according to preference variables associated with each of the plurality of image data interfaces.

* * * * *